(12) United States Patent
Thompson

(10) Patent No.: US 9,104,593 B2
(45) Date of Patent: Aug. 11, 2015

(54) FILTERING REQUESTS FOR A TRANSLATION LOOKASIDE BUFFER

(71) Applicant: Stephen P. Thompson, Longmont, CO (US)

(72) Inventor: Stephen P. Thompson, Longmont, CO (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 217 days.

(21) Appl. No.: 13/714,466

(22) Filed: Dec. 14, 2012

(65) Prior Publication Data

US 2014/0173244 A1      Jun. 19, 2014

(51) Int. Cl.
*G06F 12/10*      (2006.01)

(52) U.S. Cl.
CPC ...... *G06F 12/1027* (2013.01); *G06F 2212/681* (2013.01)

(58) Field of Classification Search
None
See application file for complete search history.

(56) References Cited

U.S. PATENT DOCUMENTS

| | | | |
|---|---|---|---|
| 2004/0268071 A1* | 12/2004 | Khan et al. | 711/163 |
| 2011/0145542 A1* | 6/2011 | Morrow | 711/207 |
| 2011/0271057 A1* | 11/2011 | Karlsson | 711/122 |

* cited by examiner

*Primary Examiner* — Duc Doan

(57) ABSTRACT

The present application describes a method and apparatus for filtering requests to a translation lookaside buffer (TLB). Some embodiments of the method include receiving, from a first translation lookaside buffer (TLB), an indication of a first virtual address associated with a request to a second TLB for a page table entry in response to a miss in the first TLB. Some embodiments of the method also include filtering the request based on a comparison of the first virtual address and one or more second virtual addresses associated with one or more previous requests to the second TLB.

10 Claims, 6 Drawing Sheets

FILTERING REQUESTS FOR A TRANSLATION LOOKASIDE BUFFER

BACKGROUND

This application relates generally to processing systems, and, more particularly, to filtering requests to a translation lookaside buffer in a processing system.

Processing devices such as central processing units (CPUs), graphics processing units (GPUs), or accelerated processing units (APUs) typically implement virtual memory systems. Processes in an operating system that uses virtual memory are configured to access memory using virtual addresses. For example, a store instruction can write information from a register to a memory location indicated by a virtual address or a load instruction can load a register with information read from a memory location indicated by a virtual address. Processing systems that implement virtual memory use a page table to store the mapping between the virtual addresses and physical addresses in memory. However, accessing the page table to acquire the physical address corresponding to a virtual address is a relatively time-consuming activity that may introduce significant latency into the system.

Conventional processing devices may therefore implement a translation lookaside buffer (TLB) that can cache mappings of virtual addresses to physical addresses in locations that are physically or logically closer to processing elements such as a load-store unit. For example, a TLB can cache virtual-to-physical address mappings of recently requested addresses. The TLB is typically implemented as content-addressable memory (CAM) that uses the virtual address as a search key and the search result is a physical address indicated by the stored mapping. If the requested address is present in the TLB, a TLB hit, the search yields a match and the retrieved physical address can be used to access memory. If the requested address is not in the TLB, a TLB miss, the translation proceeds by looking up the page table in a process called a tablewalk. The tablewalk is an expensive process that involves reading the contents of multiple memory locations and using them to compute the physical address. After the physical address is determined by the tablewalk, the virtual address to physical address mapping is entered into the TLB.

SUMMARY OF EMBODIMENTS

The disclosed subject matter is directed to addressing the effects of one or more of the problems set forth above. The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

As discussed herein, processing systems can use a TLB to cache mappings of virtual addresses to physical addresses for a subset of the virtual addresses that are allocated to different processes. The latency associated with address translations can be reduced to nearly the latency of the (relatively fast) TLB lookup. Different TLBs can be implemented for instructions or data. Multilevel TLBs may also be used. For example, a relatively small and fast L1 TLB may be backed up by a larger L2 TLB that requires more cycles perform a lookup. The lookup performed by an L2 TLB is relatively fast compared to a tablewalk. Some embodiments of a TLB complex include an instruction TLB (ITLB), a level one data TLB (L1DTLB), and a level two data TLB (L2DTLB).

An address translation for a load instruction or store instruction may be performed by posting a request for a virtual address translation to the L1TLB, which returns the physical address if the virtual address is found in an entry of the L1TLB. If the request for the virtual address translation misses in the L1 TLB, the request may be posted to the L2TLB. At least in part because of latency in processing the request to the L2TLB, the L1TLB may have to wait several cycles before receiving an acknowledgment indicating whether the request hit or missed in the L2TLB. Other misses to the same virtual address in the L1TLB may therefore cause duplicate requests to be posted to the L2TLB. The duplicate requests unnecessarily consume power and bandwidth that could be used for processing other requests to the L2TLB. Some embodiments of the methods or apparatuses described herein may therefore be used to filter requests to TLBs.

In some embodiments, a method is provided for filtering requests to a translation lookaside buffer (TLB). Some embodiments of the method include receiving, from a first TLB, an indication of a first virtual address associated with a request to a second TLB for a page table entry in response to a miss in the first TLB. Some embodiments of the method also include filtering the request based on a comparison of the first virtual address and one or more second virtual addresses associated with one or more previous requests to the second TLB.

In some embodiments, an apparatus is provided for filtering requests to a TLB. Some embodiments of the apparatus include a filter configurable to receive an indication of a first virtual address associated with a request to a second TLB for a page table entry in response to a miss in a first TLB and filter the request based on a comparison of the first virtual address and one or more second virtual addresses associated with one or more previous requests to the second TLB.

In some embodiments, a non-transitory computer readable medium is provided. Some embodiments of the non-transitory computer readable medium include instructions that when executed can configure a manufacturing process used to manufacture a semiconductor device including a filter configurable to receive an indication of a first virtual address associated with a request to a second TLB for a page table entry in response to a miss in a first TLB and filter the request based on a comparison of the first virtual address and one or more second virtual addresses associated with one or more previous requests to the second TLB.

BRIEF DESCRIPTION OF THE DRAWINGS

The disclosed subject matter may be understood by reference to the following description taken in conjunction with the accompanying drawings, in which like reference numerals identify like elements, and in which.

Figure 1:
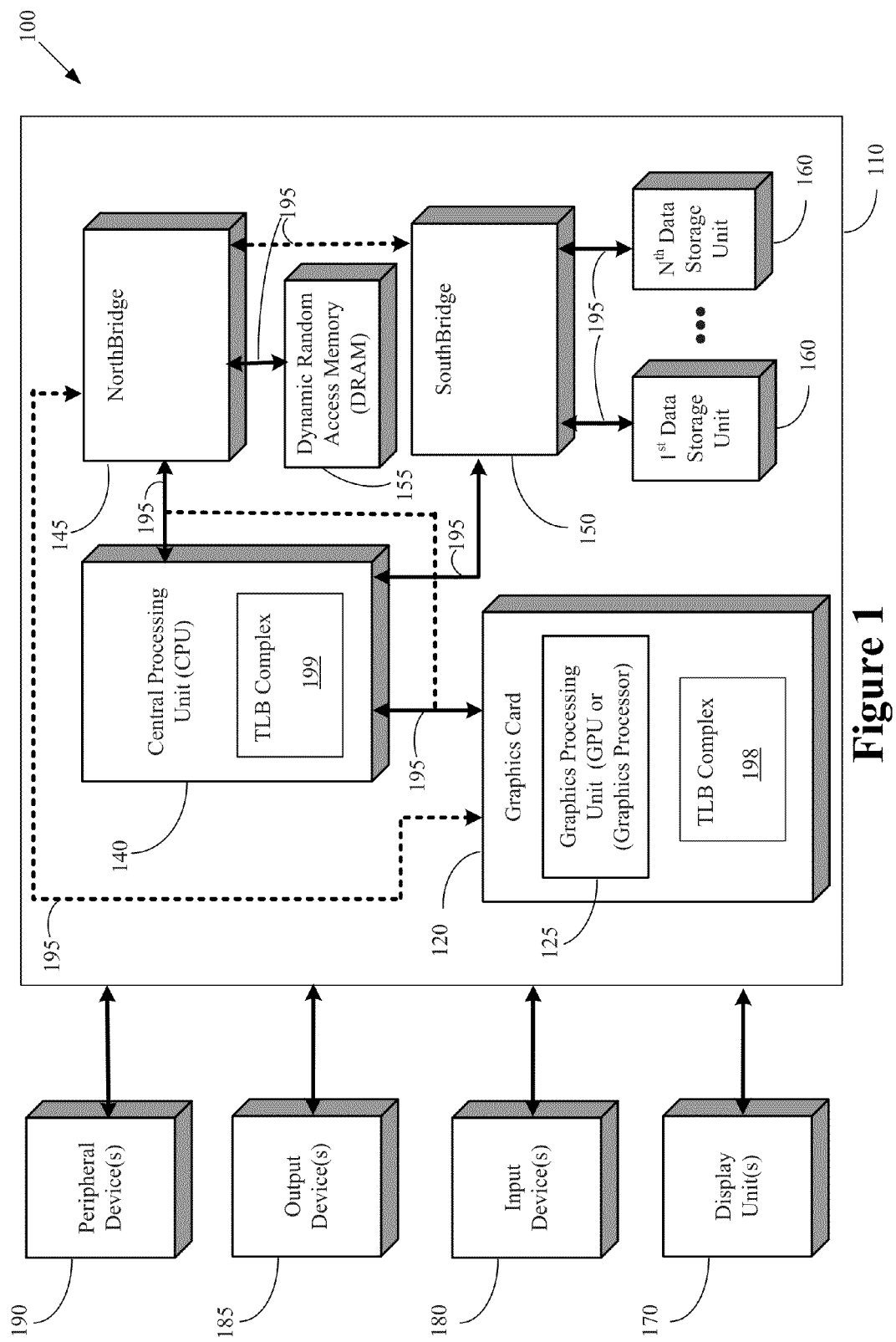
FIG. 1 conceptually illustrates a computer system in accordance with some embodiments.

While the disclosed subject matter may be modified and may take alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION

Illustrative embodiments are described below. In the interest of clarity, not all features of an actual implementation are described in this specification. It should be appreciated that in the development of any such actual embodiment, numerous implementation-specific decisions should be made, which may vary from one implementation to another. Moreover, it should be appreciated that such a development effort might be complex and time-consuming, but would nevertheless be a routine undertaking for those of ordinary skill in the art having the benefit of this disclosure. The description and drawings merely illustrate the principles of the claimed subject matter. It should thus be appreciated that those skilled in the art may be able to devise various arrangements that, although not explicitly described or shown herein, embody the principles described herein and may be included within the scope of the claimed subject matter. Furthermore, all examples recited herein are principally intended to be for pedagogical purposes to aid the reader in understanding the principles of the claimed subject matter and the concepts contributed by the inventor(s) to furthering the art, and are to be construed as being without limitation to such specifically recited examples and conditions.

The disclosed subject matter is described with reference to the attached figures. Various structures, systems and devices are schematically depicted in the drawings for purposes of explanation only and so as to not obscure the description with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition is expressly set forth in the specification in a definitional manner that directly and unequivocally provides the special definition for the term or phrase. Additionally, the term, "or," as used herein, refers to a non-exclusive "or," unless otherwise indicated (e.g., "or else" or "or in the alternative"). Also, the various embodiments described herein are not necessarily mutually exclusive, as some embodiments can be combined with one or more other embodiments to form new embodiments.

As discussed herein, latency in the processing of requests to TLBs can lead to duplicate requests for the physical address of the same page in a page table. The duplicate requests unnecessarily consume power and bandwidth that could be used for processing other requests to the TLB. At least in part to address these drawbacks in the conventional practice, the present application describes embodiments of methods and apparatuses for filtering requests to TLBs. Some embodiments implement a hierarchical TLB complex that includes one or more (relatively faster and smaller) L1 data TLBs and one or more (relatively slower and larger) L2 data TLBs. The virtual addresses of subsequent misses to the L1 data TLB may therefore be compared to virtual addresses of previous requests from the L1 data TLB that have been posted to an L2 data TLB. Requests to the L2 data TLB for the virtual addresses of the misses are then filtered based on the comparison. For example, a request filter can be configured to store the information identifying the virtual addresses of requests that have been posted to the L2 data TLB. This information may remain in the request filter until the L1 data TLB receives an acknowledgment that the posted request hit or missed in the L2 data TLB. The request filter can compare the stored virtual addresses of previous requests to the virtual addresses of subsequent misses to the L1 data TLB. If one of the missed virtual addresses is the same as one of the stored virtual addresses, the request filter determines that the virtual address of the miss is a duplicate and should not be posted to the L2 data TLB. Some embodiments that implement a dual port L1 data TLB, e.g. an L1 data TLB that includes a port for store instructions and a port for load instructions, can use the result of the comparison performed by the request filter to arbitrate between requests received at the different ports.

FIG. 1 conceptually illustrates a computer system 100 in accordance with some embodiments. The computer system 100 may be a personal computer, a laptop computer, a handheld computer, a netbook computer, a mobile device, a tablet computer, a netbook, an ultrabook, a smart television, a telephone, a personal data assistant (PDA), a server, a mainframe, a work terminal, or the like. The computer system 100 includes a main structure 110 which may be a computer motherboard, system-on-a-chip, circuit board or printed circuit board, a desktop computer enclosure or tower, a laptop computer base, a server enclosure, part of a mobile device, tablet, personal data assistant (PDA), or the like. Some embodiments of the computer system 100 run an operating system such as Linux®, Unix®, Windows®, Mac OS®, or the like.

Some embodiments of the main structure 110 include a graphics card 120. For example, the graphics card 120 may be an ATI Radeon™ graphics card from Advanced Micro Devices ("AMD"). Some embodiments of the graphics card 120 are connected on a Peripheral Component Interconnect (PCI) Bus (not shown), PCI-Express Bus (not shown), an Accelerated Graphics Port (AGP) Bus (also not shown), or other electronic or communicative connection. The graphics card 120 may contain a graphics processing unit (GPU) 125 used in processing graphics data. Some embodiments of the graphics card 120 are referred to as a circuit board or a printed circuit board or a daughter card or the like.

The computer system 100 shown in FIG. 1 also includes a central processing unit (CPU) 140, which is electronically or communicatively coupled to a northbridge 145. The CPU 140 and northbridge 145 may be housed on the motherboard (not shown) or some other structure of the computer system 100. Some embodiments of the graphics card 120 are coupled to the CPU 140 via the northbridge 145 or some other electronic or communicative connection. For example, CPU 140, northbridge 145, and GPU 125 may be included in a single package or as part of a single die or "chip". The northbridge 145 may be coupled to a system RAM (or DRAM) 155 or the system RAM 155 may be coupled directly to the CPU 140. The system RAM 155 may be of any RAM type known in the art including SRAM or DRAM and the type of RAM 155 is a matter of design choice.

Some embodiments of the northbridge 145 are connected to a southbridge 150. The northbridge 145 and southbridge 150 may be on the same chip in the computer system 100, or the northbridge 145 and southbridge 150 may be on different chips. Some embodiments of the southbridge 150 are connected to one or more data storage units 160. The data storage units 160 may be non-transitory computer readable media such as hard drives, solid state drives, magnetic tape, or any other writable media used for storing data. Some embodiments of the central processing unit 140, northbridge 145, southbridge 150, graphics processing unit 125, or DRAM 155 are implements on a computer chip or a silicon-based computer chip, or may be part of a computer chip or a silicon-based computer chip. The various components of the computer system 100 may be operatively, electrically or physically connected or linked with a bus 195 or more than one bus 195.

The computer system 100 may be connected to one or more display units 170, input devices 180, output devices 185, or peripheral devices 190. For example, the display unit 170 may be connected to the graphics card 120. The I/O devices 180, 185 and the peripheral devices 190 may be connected to the southbridge 150. These elements may be internal or external to the computer system 100 and may be wired or wirelessly connected. The display units 170 may be internal or external monitors, television screens, handheld device displays, touchscreens, and the like. The input devices 180 may be any one of a keyboard, mouse, track-ball, stylus, mouse pad, mouse button, joystick, touchscreen, scanner or the like. The output devices 185 may be any one of a monitor, printer, plotter, copier, or other output device. The peripheral devices 190 may be any other device that can be coupled to a computer. Exemplary peripheral devices 190 may include a CD/DVD drive capable of reading or writing to physical digital media, a USB device, Zip Drive, external floppy drive, external hard drive, phone or broadband modem, router/gateway, access point or the like.

The GPU 125 and the CPU 140 may be associated with TLB complexes 198, 199, respectively. In some embodiments, the TLB complexes 198, 199 are hierarchical TLB complexes that include a hierarchy of TLBs. For example, the TLB complexes 198, 199 may include an L2 data TLB (not shown in FIG. 1) that is associated with one or more L1 instruction or data TLBs (not shown in FIG. 1). The TLB complexes 198, 199 may read or write information (such as page tables or page table entries) to or from memory elements such as the DRAM 155 or the data storage units 160.

Figure 2:
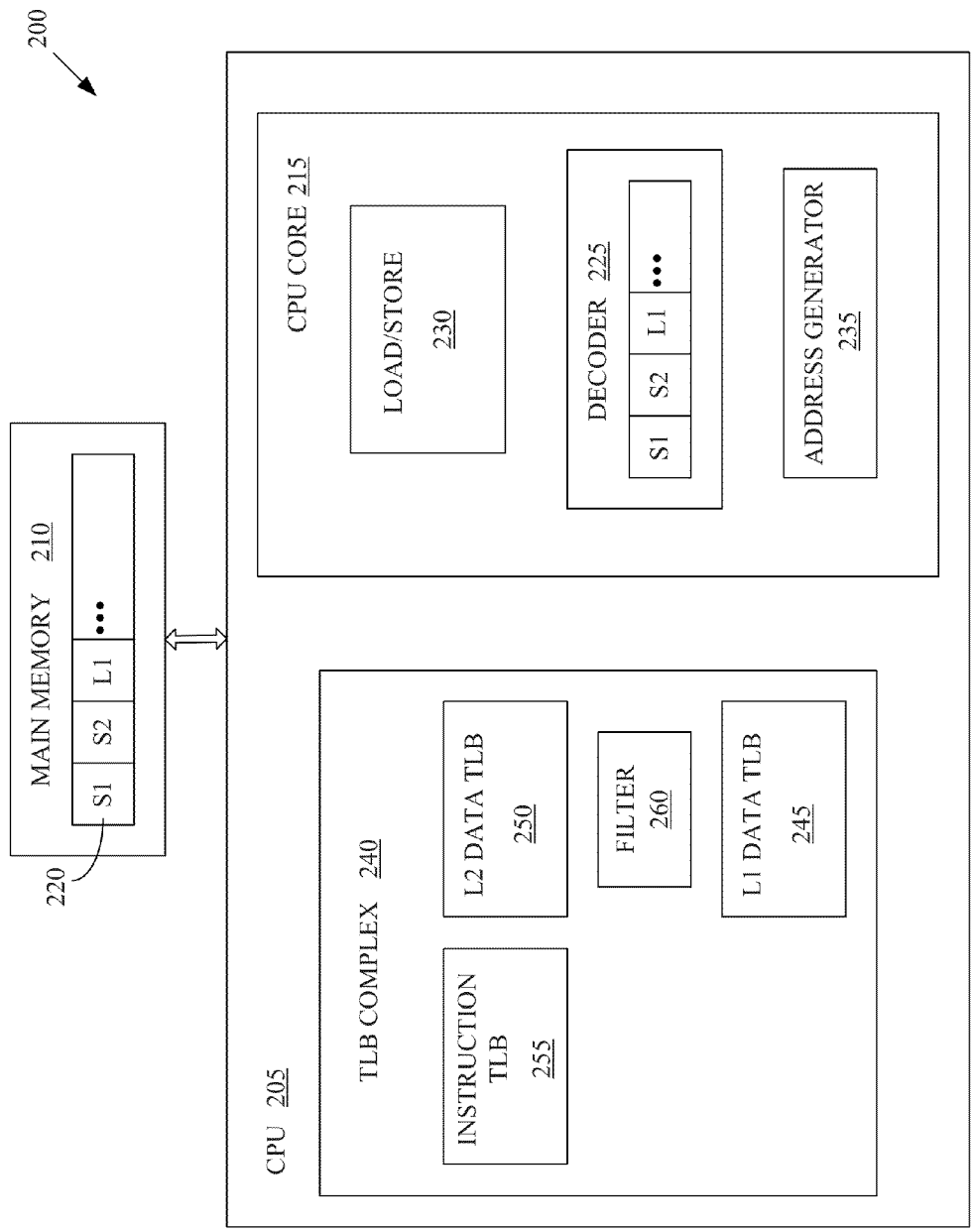
FIG. 2 conceptually illustrates a semiconductor device that may be formed in or on a semiconductor wafer (or die), in accordance with some embodiments.

FIG. 2 conceptually illustrates one example of a semiconductor device 200 that may be formed in or on a semiconductor wafer (or die), in accordance with some embodiments. The semiconductor device 200 may be formed in or on the semiconductor wafer using well known processes such as deposition, growth, photolithography, etching, planarising, polishing, annealing, and the like. The semiconductor device 200 may be implemented in some embodiments of the computer system 100 shown in FIG. 1. Some embodiments of the semiconductor device 200 include a central processing unit (CPU) 205 (such as the CPU 140 shown in FIG. 1) that is configured to access instructions or data that are stored in the main memory 210. However, as will be appreciated by those of ordinary skill the art, the CPU 205 is intended to be illustrative and some embodiments may include other types of processor such as the graphics processing unit (GPU) 125 depicted in FIG. 1, a digital signal processor (DSP), an accelerated processing unit (APU), a co-processor, an applications processor, and the like.

Some embodiments of the CPU 205 include at least one CPU core 215 that is used to execute the instructions or manipulate the data. Alternatively, the semiconductor device 200 may include multiple CPU cores 215 that work in concert with each other. The CPU 205 also implements a hierarchical (or multilevel) cache system that is used to speed access to the instructions and/or data by storing selected instructions and/or data in the caches. However, persons of ordinary skill in the art having benefit of the present disclosure should appreciate that alternative embodiments of the semiconductor device 200 may implement different configurations of the CPU 205, such as configurations that use external caches.

Processing systems utilize two basic memory access instructions: a store instruction that writes (or stores) information from a register to a memory location and a load instruction that reads information out of a memory location and loads this information into a register. The CPU core 215 can execute programs that are formed using instructions such as load instructions or store instructions. Some embodiments of the semiconductor device 200 store programs in the main memory 210 and the instructions are kept in program order, which indicates the logical order for execution of the instructions so that the program operates correctly. For example, the main memory 210 may store instructions for a program 220 that includes the store instructions S1, S2 and the load instruction L1 in program order. Persons of ordinary skill in the art having benefit of the present disclosure should appreciate that the program 220 may also include other instructions that may be performed earlier or later in the program order of the program 220.

Some embodiments of the CPU core 215 include a decoder 225 that selects and decodes program instructions so that they can be executed by the CPU core 215. The decoder 225 can dispatch, send, or provide the decoded instructions to a load/store unit 230. In some embodiments, the CPU core 215 is an out-of-order processor that can execute instructions in an order that differs from the program order of the instructions in the associated program. For example, the decoder 225 may select or decode instructions from the program 220 and then the load/store unit 230 may pick the instructions in the order L1, S1, S2, which differs from the program order of the program 220 because the load instruction L1 is picked before the store instructions S1, S2.

The semiconductor device 200 shown in FIG. 2 implements virtual memory and so the load instructions or store instructions from the program 220 are allocated virtual memory addresses to identify memory locations used by the load instruction or store instruction. Some embodiments of the semiconductor device 200 include an address generator 235 that is configurable to translate virtual addresses used by the instructions into physical addresses that identify memory locations in the main memory 210 or one or more caches implemented by the semiconductor device 200. The CPU core 215 may therefore be electronically or communicatively coupled to a TLB complex 240 that holds information that is used to translate virtual addresses into physical addresses. Some embodiments of the semiconductor device 200 implement a hierarchical TLB complex 240 that includes one or more L1 data TLBs 245, one or more L2 data TLBs 250, and one or more instruction TLBs 255.

The address generator 235 may attempt to acquire address translations by posting requests to the TLB complex 240. For example, when a store instruction (such as S1 or S2) is picked, the address generator 235 may post a request to the TLB complex 240 for the physical address corresponding to the virtual address of the memory location referenced by the store instruction. The request is initially posted to the L1 data TLB 245, which returns the physical address if the virtual address is found in an entry of the L1 data TLB 245. If the request for the virtual address translation misses in the L1 data TLB 245, the request may be posted to the L2 data TLB 250. As discussed herein, latency in processing the request to the L2 data TLB 250 may cause the L1 data TLB 245 to wait several cycles before receiving an acknowledgment indicating whether the request hit or missed in the L2 data TLB 250. Other misses to the same virtual address in the L1 data TLB 245 may therefore cause duplicate requests to be posted to the L2 data TLB 250, e.g. during the latency period for the request to the L2 data TLB 250.

The TLB complex 240 depicted in FIG. 2 implements a filter 260 for filtering requests to the L2 data TLB 250. Some embodiments of the filter 260 compare the virtual addresses of misses to the L1 data TLB 245 to virtual addresses of requests from the L1 data TLB 245 that have been posted to the L2 data TLB 250. The filter 260 can therefore filter requests to the L2 data TLB 250 based on the comparison. For example, the filter 260 can be configured to store information identifying the virtual addresses of requests that have been posted to the L2 data TLB 250. This information may remain in the filter 260 until the L1 data TLB 245 receives an acknowledgment that the posted request hit or missed in the L2 data TLB 250. The filter 260 can compare the stored virtual addresses to the virtual addresses of misses to the L1 data TLB 245. If one of the missed virtual addresses is the same as one of the stored virtual addresses, the filter 260 determines that the virtual address of the miss is a duplicate and should not be posted to the L2 data TLB 250. The filter 260 may then cause the request to be prevented by filtering the request instead of posting the request. As used herein, the term "prevent" should be understood to indicate that the L1 data TLB 245 (or other entity) initiated a process that potentially could have led to a request being posted to the L2 data TLB 250 but this potential request was filtered and consequently was not posted to the L2 data TLB 250, e.g., because the filter 260 determined that a request to the same virtual address has been posted and is pending in the L2 data TLB 250.

Figure 3:
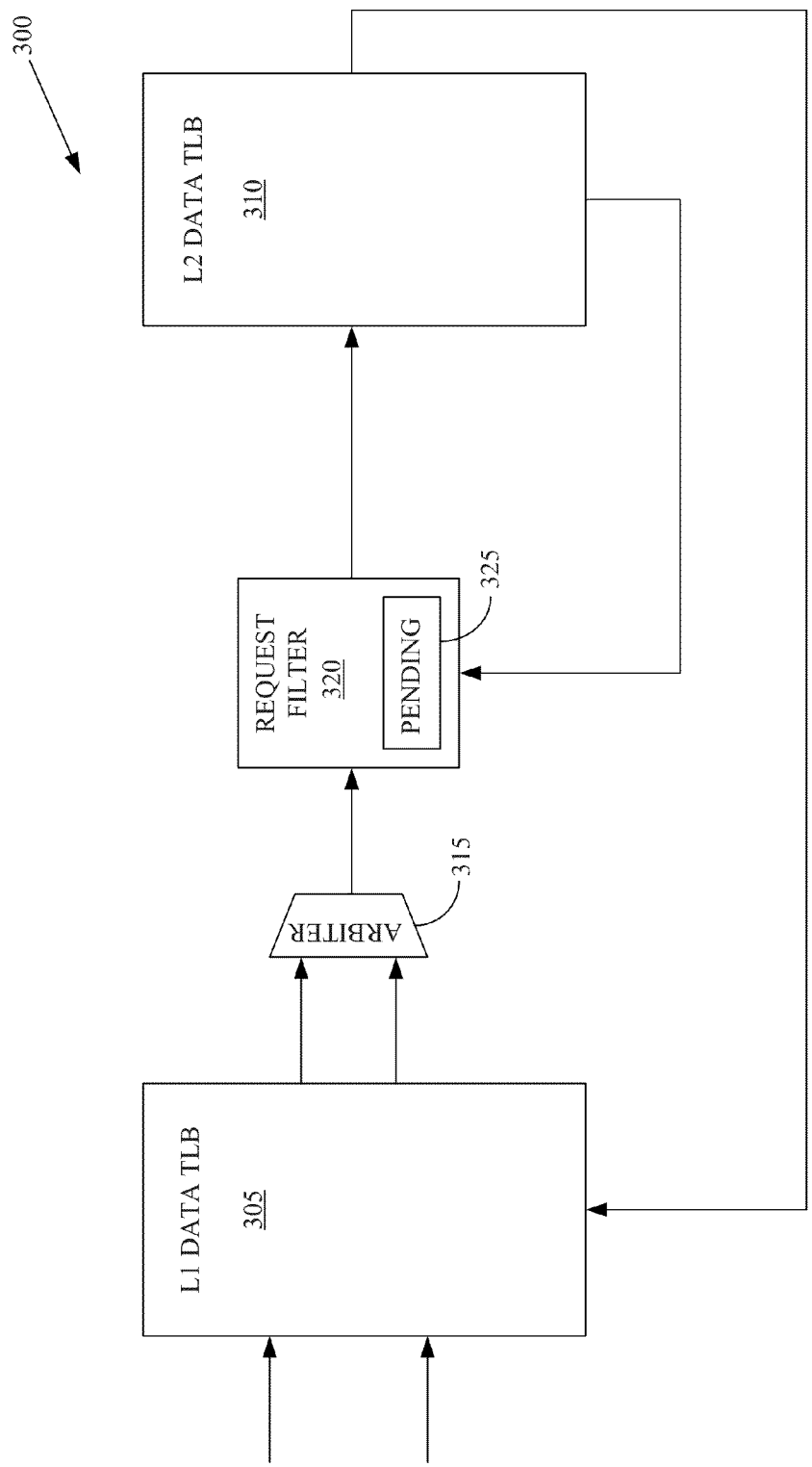
FIG. 3 conceptually illustrates a portion of a TLB complex, in accordance with some embodiments.

FIG. 3 conceptually illustrates a portion of a TLB complex 300, in accordance with some embodiments. The TLB complex 300 includes an L1 data TLB 305 and an L2 data TLB 310, such as the TLBs 245, 250 shown in FIG. 2. The L1 data TLB 305 shown in FIG. 3 is a dual port TLB that can concurrently receive two requests for address translations, such as a request from a load instruction and a request from a store instruction. The requests can be forwarded to an arbiter 315 if either or both of the requests miss in the L1 data TLB 305. The arbiter 315 can be configured to select one of the requests for posting to the L2 data TLB 310. For example, the arbiter 315 may implement policies that can be used to select between the different requests. The policies may allow the arbiter 315 to account for dependencies between the instructions, as well as other priorities or algorithms for selecting between the different requests. The arbiter 315 may then forward the selected request to a request filter 320.

The request filter 320 shown in FIG. 3 can be configured to filter requests received from the arbiter 315 to prevent posting duplicate requests to the L2 data TLB 310. Some embodiments of the request filter 320 include information 325 that identifies virtual addresses associated with pending requests that have been posted to the L2 data TLB 310 but have not yet been acknowledged by the L2 data TLB 310. The request filter 320 may therefore compare the virtual addresses of these pending requests to the virtual address of the request received from the arbiter 315. If the virtual address of the received request matches any of the virtual addresses indicated by the pending information 325, the request filter 320 may prevent the request from being posted, e.g., by blocking or filtering the request so that it is not provided to the L2 data TLB 310. Information indicating the virtual addresses of requests that are received from the arbiter 315 and posted to the L2 data TLB 310 may be added to the pending information 325 so that they can be used for filtering subsequent requests from the arbiter 315. The request filter 320 may also receive feedback from the L2 data TLB 310 acknowledging that a previously posted request hit or missed in the L2 data TLB 310. The request filter 320 may then remove the information indicating the acknowledged addresses from the pending information 325.

Figure 4:
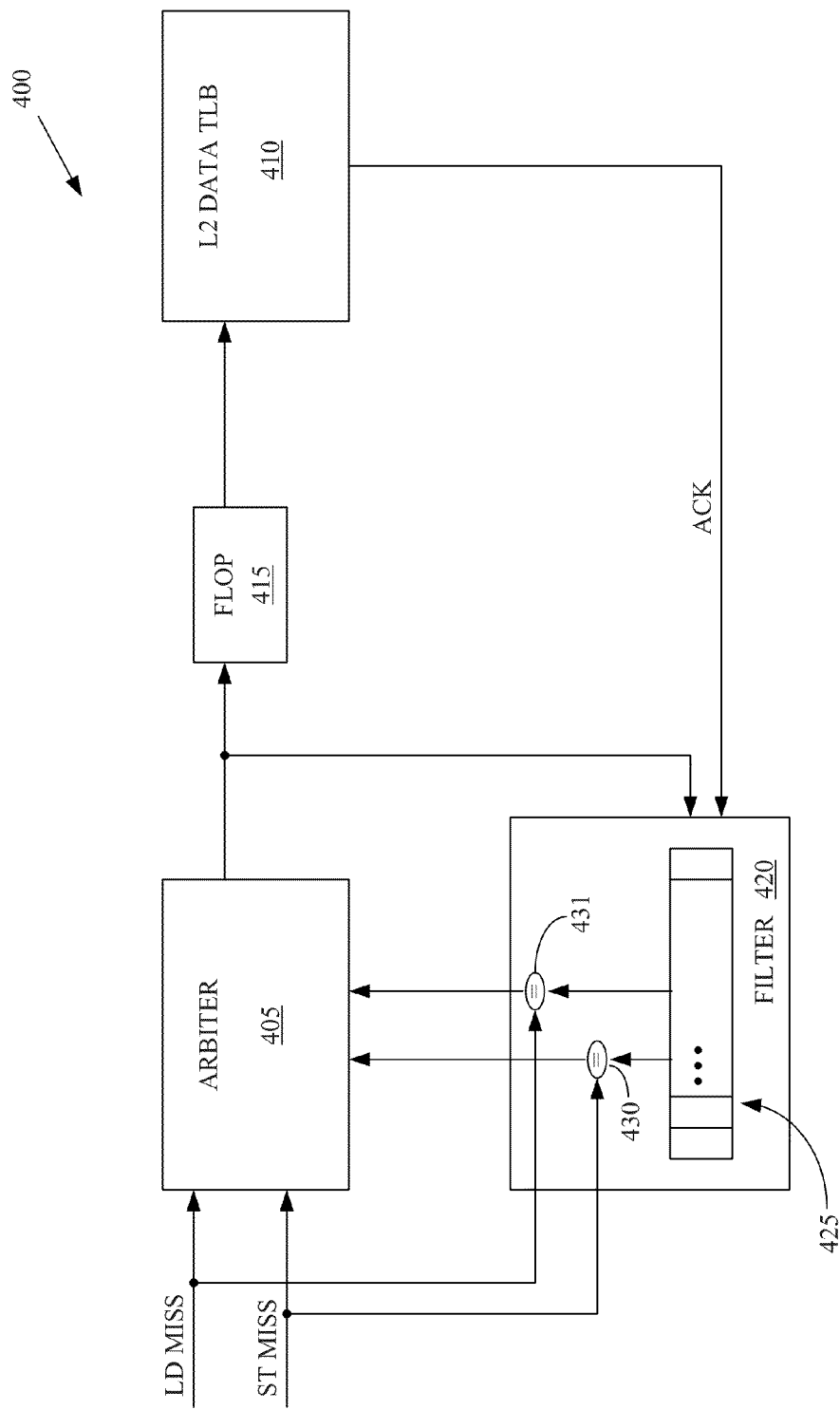
FIG. 4 conceptually illustrates a portion of a TLB complex such as the TLB complex shown in FIG. 3, in accordance with some embodiments.

FIG. 4 conceptually illustrates one example of a portion of a TLB complex 400, in accordance with some embodiments. The TLB complex 400 includes an arbiter 405 that can receive address translation requests in response to misses in an associated L1 data TLB (not shown in FIG. 4). Some embodiments of the arbiter 405 may be configured to receive multiple concurrent address translation requests such as a request in response to a load miss (LD MISS) and a request in response to a store miss (ST MISS) to the L1 data TLB. The arbiter 405 can be configured to select one of the requests for posting to an L2 data TLB 410. Some embodiments of the arbiter 405 and the L2 data TLB 410 may be communicatively coupled to one or more flip-flops 415 for storing information indicative of the address translation requests between clock cycles.

The TLB complex 400 shown in FIG. 4 also includes a filter 420 that is configured to receive the address translation requests that are provided to the arbiter 405. The filter 420 maintains a list 425 of pending requests that have been posted to the L2 data TLB 410 but have not been acknowledged as hitting or missing in the L2 data TLB 410. The list 425 may be implemented using memory structures such as registers, buffers, flip-flops, and the like. The filter 420 also includes comparators 430, 431 that can be configured to compare the virtual addresses of the received address translation requests to the virtual addresses of the pending requests stored in the list 425. The results of the comparisons may be signaled to the arbiter 405, which may use this information to decide which address translation requests should be posted to the L2 data TLB 410. For example, if one of the requests corresponds to a virtual address that matches a virtual address in the list 425, the arbiter 405 may select the other address translation requests for posting to the L2 data TLB 410. The arbiter 405 may therefore prevent posting of the address translation requests that correspond to the virtual address that matches one of the virtual addresses in the list 425.

Some embodiments of the filter 420 may be configured to receive information from the arbiter 405 or the L2 data TLB 410. For example, the filter 420 may receive information from the arbiter 405 indicating virtual addresses of requests that are posted to the L2 data TLB 410. The filter 420 may then add these to the list 425. For another example, the filter 420 may receive acknowledgments from the L2 data TLB 410 indicating that an address translation request hit or missed in the L2 data TLB 410. The filter 420 may then remove the corresponding virtual address of the acknowledged address translation requests from the list 425.

Figure 5:
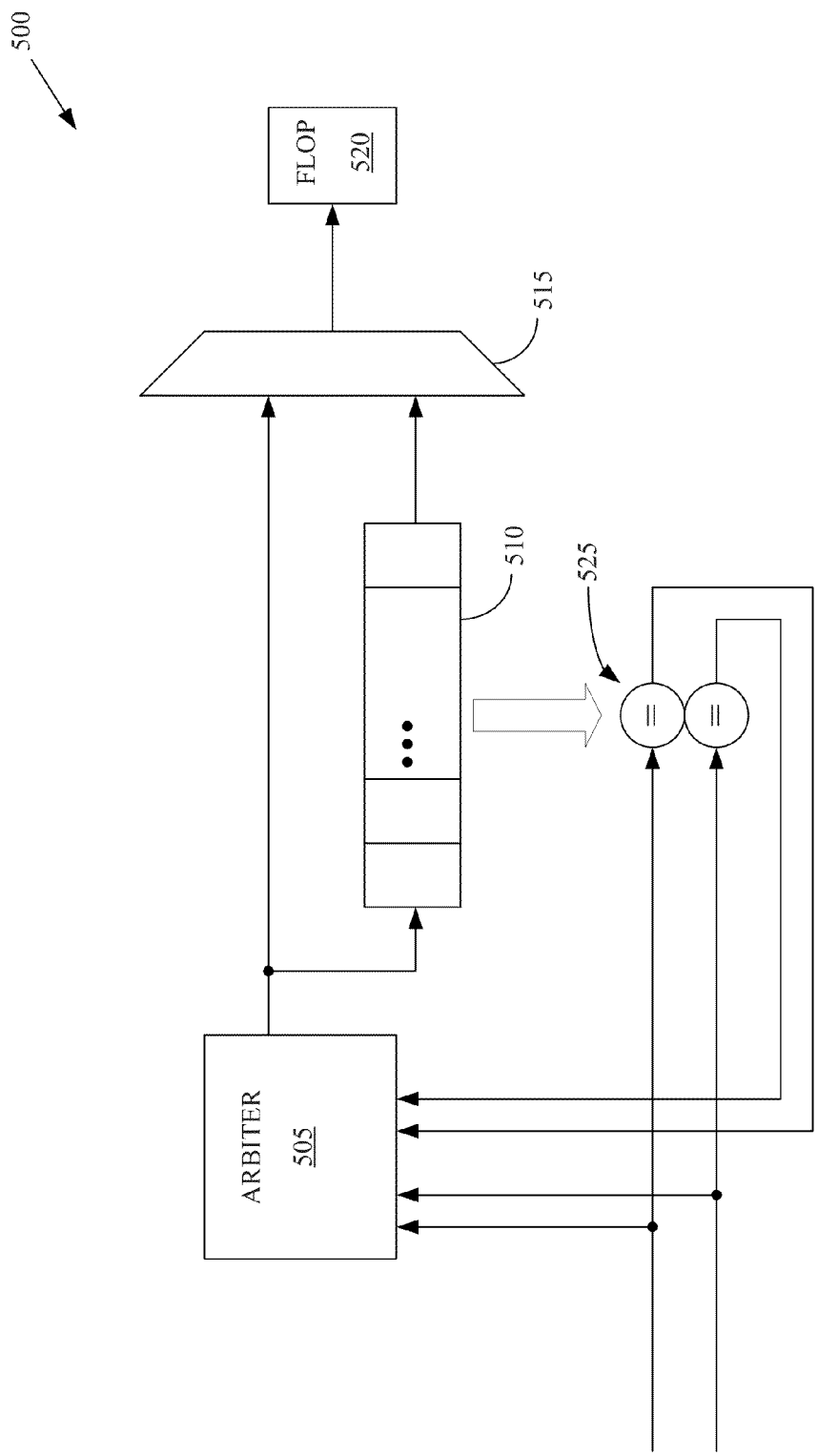
FIG. 5 conceptually illustrates a portion of a TLB complex such as the TLB complex shown in FIG. 3, in accordance with some embodiments.

FIG. 5 conceptually illustrates a portion of a TLB complex 500, in accordance with some embodiments. The TLB complex 500 includes an arbiter 505 that can receive address translation requests in response to misses in an associated L1 data TLB (not shown in FIG. 5). Some embodiments of the TLB complex 500 may not be fully pipelined and so address translation requests may be accumulated in a buffer 510. For example, an L2 data TLB (not shown in FIG. 5) may be configured to process address translation requests every other cycle. If requests are received from the L1 data TLB in consecutive cycles, the arbiter 505 may provide the first request to the L2 data TLB and buffer the second request in the buffer 510. Buffered requests may subsequently be provided to the L2 data TLB. The TLB complex 500 may therefore include a multiplexer 515 that can be used to select between address translation requests provided directly by the arbiter 505 and address translation requests provided by the buffer 510. The selected address translation requests may be provided to a flip-flop 520 that is communicatively connected to the L2 data TLB.

Requests may be stored in the buffer 510 for several cycles and this latency may cause the arbiter 505 to issue address translation requests for duplicate virtual addresses, as discussed herein. Virtual addresses in requests received by the TLB complex 500 may therefore be compared to the virtual addresses of requests in the buffer 510 using the comparator 525. The results of the comparison may be signaled to the arbiter 505, which may use this information to decide which address translation request to post to the L2 data TLB. For example, if one of the requests corresponds to a virtual address that matches a virtual address in the buffer 510, the arbiter 505 may select the other address translation request for posting to the L2 data TLB. The arbiter 505 may therefore prevent posting of the address translation request that corresponds to the virtual address that matches one of the virtual addresses in the buffer 510.

Figure 6:
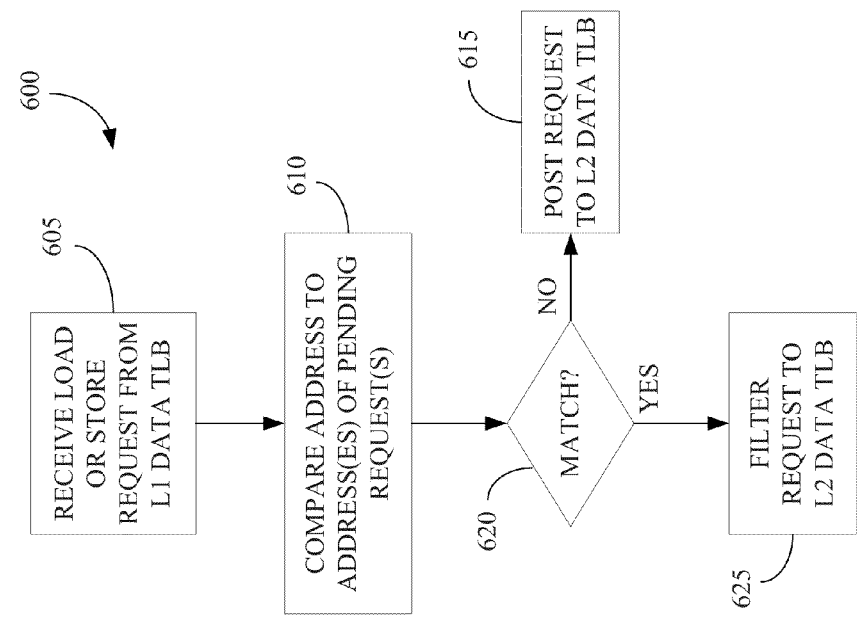
FIG. 6 conceptually illustrates a method of filtering requests to a TLB, in accordance with some embodiments.

FIG. 6 conceptually illustrates a method 600 of filtering requests to a TLB, in accordance with some embodiments. Some embodiments of the method 600 may be used to filter requests posted to a L2 data TLB in response to a miss in an L1 data TLB. An address translation request associated with a load instruction or a store instruction is received (at 605) from an L1 data TLB in response to a miss in the L1 data TLB. The virtual address associated with the address translation request is compared (at 610) to virtual addresses associated with pending address translation requests at the L2 data TLB. The request is posted (at 615) to the L2 data TLB if the virtual address associated with the request does not match (at 620) any of the addresses associated with the pending address translation requests. The request is filtered (at 625) if the virtual address matches will be address associated with the pending address translation requests so that the request is not provided to the L2 data TLB.

Figure 7:
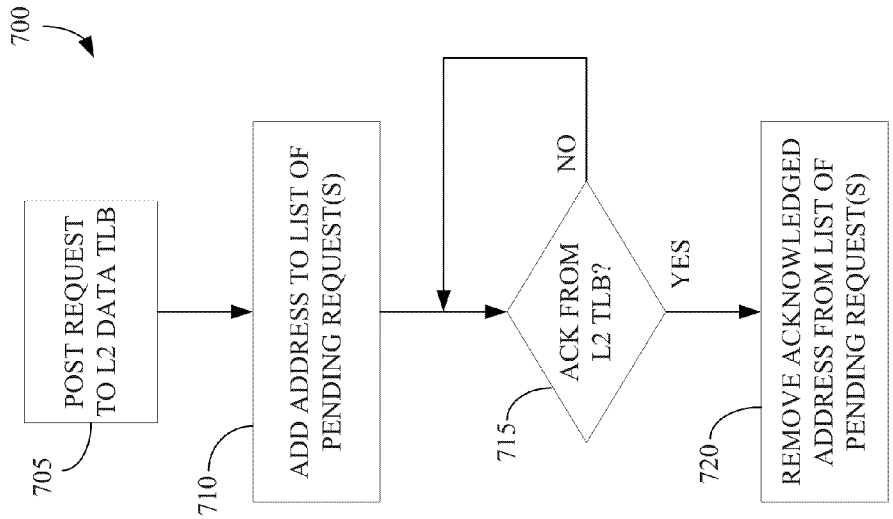
FIG. 7 conceptually illustrates a method of maintaining a list of pending requests that can be used to filter requests to a TLB, in accordance with some embodiments.

FIG. 7 conceptually illustrates a method 700 of maintaining a list of pending requests that can be used to filter requests to a TLB, in accordance with some embodiments. A request for an address translation may be posted (at 705) from an L1 data TLB to an L2 data TLB in response to the request missing in the L1 data TLB. The virtual address indicated in the request may therefore be added (at 710) to a list of pending requests that have been posted to the L2 data TLB. The system may monitor (at 715) acknowledgments that indicate whether the posted request hit or missed in the L2 data TLB. If an acknowledgment is received (at 715) from the L2 data TLB, the virtual address corresponding to the acknowledged requests can be removed (at 720) from the list of pending requests. Subsequent requests for this virtual address may therefore be posted to the L2 data TLB and may not be filtered or bypassed.

Embodiments of processor systems that can filter requests to a TLB as described herein (such as the computer system 100) can be fabricated in semiconductor fabrication facilities according to various processor designs. In some embodiments, a processor design can be represented as code stored on a computer readable media. Examples of codes that may be used to define and/or represent the processor design may include HDL, Verilog, and the like. The code may be written by engineers, synthesized by other processing devices, and used to generate an intermediate representation of the processor design, e.g., netlists, GDSII data and the like. The intermediate representation can be stored on computer readable media and used to configure and control a manufacturing/fabrication process that is performed in a semiconductor fabrication facility. The semiconductor fabrication facility may include processing tools for performing deposition, photolithography, etching, polishing/planarizing, metrology, and other processes that are used to form transistors and other circuitry on semiconductor substrates. The processing tools can be configured and are operated using the intermediate representation, e.g., through the use of mask works generated from GDSII data.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be a non-transitory computer readable medium such as a magnetic medium (e.g., a floppy disk or a hard drive) or an optical medium (e.g., a compact disk read only memory, or "CD ROM"), and may be read-only or random access. Similarly, the transmission medium may be twisted wire pairs, coaxial cable, optical fiber, or some other suitable transmission medium known to the art. The disclosed subject matter is not limited by these aspects of any given implementation.

Furthermore, the methods disclosed herein may be governed by instructions that are stored in a non-transitory computer readable storage medium and that are executed by at least one processor of a computer system. Each of the operations of the methods may correspond to instructions stored in a non-transitory computer memory or computer readable storage medium. In various embodiments, the non-transitory computer readable storage medium includes a magnetic or optical disk storage device, solid state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. A method, comprising:
receiving, from a first translation lookaside buffer (TLB), an indication of a first virtual address associated with a request to a second TLB for a page table entry in response to a miss in the first TLB; and
filtering the request based on a comparison of the first virtual address and one or more second virtual addresses associated with one or more previous requests to the second TLB;
posting the request to the second TLB in response to the comparison indicating that the first virtual address differs from the one or more second virtual addresses;
adding the first virtual address to a list comprising the one or more second virtual addresses for comparison with subsequent requests from the first TLB and filtering of the subsequent requests based on the comparison; and
removing virtual addresses from the list in response to receiving an acknowledgment from the second TLB indicating that a request associated with the one or more second virtual address hit or missed in the second TLB.

2. The method of claim 1, wherein the first TLB is an L1 data TLB, and wherein the second TLB is an L2 data TLB.

3. The method of claim 1, comprising preventing posting the request to the second TLB in response to the comparison indicating that the first virtual address is the same as one of the second virtual addresses.

4. An apparatus, comprising:
a filter configurable to receive an indication of a first virtual address associated with a request to a second translation lookaside buffer (TLB) for a page table entry in response to a miss in a first TLB and filter the request based on a comparison of the first virtual address and one or more second virtual addresses associated with one or more previous requests to the second TLB, the filter further configurable to post the request to the second TLB in response to the comparison indicating that the first virtual address differs from the one or more second virtual addresses; and wherein the filter comprises a memory structure for storing a list comprising the second virtual addresses, and wherein the filter is configurable to store the first virtual address in the list for comparison with subsequent requests from the first TLB and filter the subsequent requests based on the comparison and the filter is configurable to remove virtual addresses from the list in response to receiving an acknowledgment from the second TLB indicating that a request associated with the virtual address hit or missed in the second TLB.

5. The apparatus of claim 4, comprising the first TLB and the second TLB, wherein the first and second TLBs are communicatively coupled to the filter.

6. The apparatus of claim 5, wherein the first TLB is an L1 data TLB, and wherein the second TLB is an L2 data TLB.

7. The apparatus of claim 4, wherein the filter is configurable to prevent posting of the request to the second TLB in response to the comparison indicating that the first virtual address is the same as one of the one or more second virtual addresses.

8. The apparatus of claim 4, comprising an arbiter, and wherein the filter is configurable to compare a plurality of first virtual addresses associated with a plurality of requests from the first TLB and the one or more second virtual addresses and provide an indication to the arbiter that at least one of the plurality of first virtual addresses is the same as one of the one or more second virtual addresses.

9. The apparatus of claim 8, wherein the plurality of first virtual addresses comprises a virtual address associated with a load instruction and a virtual address associated with a store instruction.

10. The apparatus of claim 8, wherein the arbiter is configurable to select one of the plurality of requests based on the indication received from the filter such that the selected one of the plurality of requests is associated with one of the plurality of first virtual addresses that differs from the one or more second virtual addresses.

* * * * *